US012115642B2

(12) United States Patent
Widder et al.

(10) Patent No.: US 12,115,642 B2
(45) Date of Patent: Oct. 15, 2024

(54) POWER TOOL INCLUDING LOSS OF CONTROL MITIGATION

(71) Applicant: MILWAUKEE ELECTRIC TOOL CORPORATION, Brookfield, WI (US)

(72) Inventors: Joshua D. Widder, Racine, WI (US); Kyle J. Krause, Milwaukee, WI (US); Brennan O'Gorman, Brookfield, WI (US); Jesse Gibb, Brookfield, WI (US); Joseph W. Miller, Waukesha, WI (US); Mauricio Builes Zapata, Wauwatosa, WI (US); Ronnay Jackson, Brookfield, WI (US); Brittany A. Sellnow, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/311,044

(22) Filed: May 2, 2023

(65) Prior Publication Data

US 2023/0356381 A1 Nov. 9, 2023

Related U.S. Application Data

(60) Provisional application No. 63/337,916, filed on May 3, 2022, provisional application No. 63/380,634, filed on Oct. 24, 2022.

(51) Int. Cl.
*B25F 5/02* (2006.01)
*B25D 16/00* (2006.01)

(52) U.S. Cl.
CPC .............. *B25F 5/02* (2013.01); *B25D 16/006* (2013.01); *B25D 2250/221* (2013.01)

(58) Field of Classification Search
CPC ........ B25F 5/00; B25F 5/025; B23Q 11/0092; B25D 16/00; B25D 2250/221
See application file for complete search history.

(56) References Cited

U.S. PATENT DOCUMENTS 4,152,833 A 5/1979 Phillips
4,267,914 A * 5/1981 Saar .................... H02H 7/0854 318/275

(Continued)

FOREIGN PATENT DOCUMENTS

CN 206149690 U 5/2017
DE 3103286 A1 8/1982

(Continued)

OTHER PUBLICATIONS

Chinese Patent Office Action for Application No. 202321039228.2 dated Jan. 29, 2024 (2 pages including statement of relevance).

(Continued)

*Primary Examiner* — Nathaniel C Chukwurah
(74) *Attorney, Agent, or Firm* — Quarles & Brady LLP

(57) ABSTRACT

A power tool includes a housing, a motor, a switching network electrically coupled to the motor, and a printed circuit board positioned at an angle within the housing. The power tool further includes a user input configured to receive a sensitivity level for loss of control detection, a sensor configured to measure an acceleration of the housing with respect to at least two axes, and an electronic processor coupled to the switching network. The electronic processor is configured to receive one or more signals related to the acceleration of the housing of the power tool from the acceleration sensor, determine that the one or more signals exceed an acceleration threshold corresponding to the sensitivity level for loss of control detection, and control the switching network to brake the brushless DC motor in response to the one or more signals exceeding the acceleration threshold.

20 Claims, 13 Drawing Sheets

(56) References Cited

U.S. PATENT DOCUMENTS

| | | | |
|---|---|---|---|
| 4,573,556 | A | 3/1986 | Andreasson |
| 4,628,233 | A | 12/1986 | Bradus |
| RE33,379 | E | 10/1990 | Bradus |
| 7,320,368 | B2 | 1/2008 | Watanabe |
| 7,334,648 | B2 | 2/2008 | Arimura |
| 7,403,131 | B2 | 7/2008 | Gossett et al. |
| 7,419,013 | B2 | 9/2008 | Sainomoto et al. |
| 7,446,493 | B2 | 11/2008 | Forster et al. |
| 7,551,411 | B2 | 6/2009 | Woods et al. |
| 7,817,384 | B2 | 10/2010 | Woods et al. |
| 8,561,715 | B2 | 10/2013 | Gut et al. |
| 8,579,041 | B2 | 11/2013 | Pellenc |
| 8,657,031 | B2 | 2/2014 | Kononenko et al. |
| 8,674,640 | B2 | 3/2014 | Suda et al. |
| 8,678,106 | B2 | 3/2014 | Matsunaga et al. |
| 8,752,301 | B2 | 6/2014 | George |
| 9,144,875 | B2 | 9/2015 | Schlesak et al. |
| 9,555,525 | B2 | 1/2017 | Wu et al. |
| 9,802,305 | B2 | 10/2017 | Diem et al. |
| 9,954,418 | B2 | 4/2018 | Kawakami et al. |
| 9,978,541 | B2 | 5/2018 | Mizutani et al. |
| 10,046,429 | B2 | 8/2018 | Stock et al. |
| 10,071,500 | B2 | 9/2018 | George |
| 10,144,122 | B2 | 12/2018 | Steurer |
| 10,322,502 | B2 | 6/2019 | Wirnitzer et al. |
| 10,326,337 | B2 | 6/2019 | Omura et al. |
| 10,654,153 | B2 | 5/2020 | Murakami et al. |
| 10,661,424 | B2 | 5/2020 | Sawano et al. |
| 10,780,563 | B2 | 9/2020 | Ichikawa et al. |
| 10,811,937 | B2 | 10/2020 | Kawakami et al. |
| 10,850,380 | B2 | 12/2020 | Huber et al. |
| 10,883,660 | B2 | 1/2021 | Nishimiya et al. |
| 10,953,532 | B2 | 3/2021 | Sunabe et al. |
| 10,981,267 | B2 | 4/2021 | Abbott et al. |
| 11,084,158 | B2 | 8/2021 | Machida et al. |
| 11,179,824 | B2 | 11/2021 | Kondo |
| 11,221,611 | B2 | 1/2022 | Abbott et al. |
| 2002/0134811 | A1 | 9/2002 | Napier et al. |
| 2004/0181951 | A1 | 9/2004 | Wittke |
| 2005/0055832 | A1 | 3/2005 | Jaensch |
| 2007/0008162 | A1 | 1/2007 | Gossett et al. |
| 2009/0065225 | A1 | 3/2009 | Forster et al. |
| 2009/0193669 | A1 | 8/2009 | Gorenflo |
| 2009/0229957 | A1 | 9/2009 | Nishimiya et al. |
| 2012/0036725 | A1 | 2/2012 | Osborne et al. |
| 2013/0119792 | A1 | 5/2013 | Nishimiya et al. |
| 2014/0000921 | A1* | 1/2014 | Vanko .................... B23Q 17/22 173/11 |
| 2014/0166323 | A1 | 6/2014 | Cooper |
| 2014/0262389 | A1 | 9/2014 | Simeone et al. |
| 2015/0283685 | A1 | 10/2015 | Kynast et al. |
| 2016/0354889 | A1 | 12/2016 | Ely et al. |
| 2016/0354911 | A1 | 12/2016 | Aoki et al. |
| 2017/0008159 | A1 | 1/2017 | Boeck et al. |
| 2018/0099391 | A1 | 4/2018 | Umemoto et al. |
| 2018/0099399 | A1 | 4/2018 | Sunabe et al. |
| 2018/0174773 | A1 | 6/2018 | Mizutani et al. |
| 2020/0078918 | A1 | 3/2020 | Yoshikane et al. |
| 2020/0078921 | A1 | 3/2020 | Sawano et al. |
| 2020/0101586 | A1 | 4/2020 | Sawano et al. |
| 2020/0180132 | A1 | 6/2020 | Schlegel et al. |
| 2020/0262045 | A1 | 8/2020 | Perrier et al. |
| 2021/0078151 | A1 | 3/2021 | Huber et al. |
| 2021/0094164 | A1 | 4/2021 | Numata |
| 2021/0220959 | A1 | 7/2021 | Matsubara et al. |
| 2021/0229258 | A1 | 7/2021 | Abbott et al. |
| 2021/0283759 | A1 | 9/2021 | Merget et al. |
| 2021/0288489 | A1 | 9/2021 | Inam et al. |
| 2021/0299843 | A1 | 9/2021 | Abbott et al. |
| 2021/0331304 | A1 | 10/2021 | Machida et al. |

FOREIGN PATENT DOCUMENTS

| | | | |
|---|---|---|---|
| DE | 4328599 | A1 | 3/1994 |
| DE | 102015221685 | A1 | 5/2017 |
| DE | 102016203925 | A1 | 9/2017 |
| EP | 1398119 | B1 | 4/2010 |
| EP | 2656977 | A2 | 10/2013 |
| EP | 3263288 | A2 | 1/2018 |
| WO | 2010067789 | A1 | 6/2010 |
| WO | 2020260069 | A1 | 12/2020 |
| WO | 2020260079 | A1 | 12/2020 |
| WO | 2022082037 | A1 | 4/2022 |

OTHER PUBLICATIONS

Extended European Search Report for Application No. 23171159.9 dated Aug. 22, 2023 (10 pages).

* cited by examiner

POWER TOOL INCLUDING LOSS OF CONTROL MITIGATION

RELATED APPLICATIONS

This application claims the benefit of U.S. Provisional Patent Application No. 63/337,916, filed May 3, 2022, and U.S. Provisional Patent Application No. 63/380,634, filed Oct. 24, 2022, the entire content of each of which is hereby incorporated by reference herein.

FIELD

Embodiments described herein related to preventing loss of control of a power tool.

SUMMARY

Embodiments described herein provide a power tool that includes a housing, a first variable speed input, a second variable speed input, a brushless direct current ("DC") motor, a switching network, a printed circuit board, a user input, an acceleration sensor, and an electronic processor. The housing includes a motor housing portion, a handle portion, and a battery pack interface. The first variable speed input is configured to set a maximum operating speed for the power tool. The second variable speed input is configured to control an operating speed for the power tool up to the maximum operating speed for the power tool. The brushless direct current ("DC") motor is within the motor housing portion and has a rotor and a stator. The rotor is configured to rotationally drive a motor shaft about a rotational axis. The switching network is electrically coupled to the brushless DC motor. The printed circuit board is positioned at an angle within the housing. The user input is configured to set a sensitivity level for loss of control detection. The acceleration sensor is located on the printed circuit board. The acceleration sensor is configured to measure an acceleration of the housing of the power tool with respect to at least two axes. The electronic processor is connected to the switching network and the sensor. The electronic processor is configured to control the switching network to drive the brushless DC motor at a speed based on the first variable speed input and the second variable speed input, receive one or more signals related to the acceleration of the housing of the power tool from the acceleration sensor, determine that the one or more signals exceed an acceleration threshold corresponding to the sensitivity level for loss of control detection, and control the switching network to brake the brushless DC motor in response to the one or more signals exceeding the acceleration threshold.

Embodiments described herein provide a power tool (e.g., a rotary hammer) configured to detect a loss of control event. The power tool includes a housing having a motor housing portion, a handle portion, a trigger, and a battery pack interface. The power tool further includes a brushless direct current ("DC") motor within the motor housing portion and having a rotor and a stator. The rotor is configured to rotationally drive a motor shaft about a rotational axis. The power tool further includes a switching network electrically coupled to the brushless DC motor. The power tool further includes an angled printed circuit board ("PCB") positioned at an angle within the power tool. The power tool further includes a receiver configured to receive a set sensitivity level for loss of control detection, and a sensor configured on the printed circuit board configured to measure an acceleration of the housing with respect to at least two axes. The power tool includes an electronic processor coupled to the switching network and the sensor and configured to implement loss of control of the power tool, wherein the electronic processor is configured to control the switching network to drive the brushless DC motor at a speed at or below a maximum operating speed set by the variable speed input, receive acceleration measurements of the housing the power tool from the sensor, and determine at least one predetermined threshold corresponding to the set loss of control sensitivity level. The electronic processor is further configured to determine that a plurality of acceleration measurements of the housing of the power tool exceed the at least one predetermined acceleration threshold corresponding to the set loss of control sensitivity level. The electronic processor controls the switching network to brake the brushless DC motor in response to determining that the plurality of acceleration measurements exceed a threshold value.

Embodiments described herein provide a power tool that includes a housing having a motor housing portion, a handle portion, and a battery pack interface. The power tool further includes a brushless direct current ("DC") motor within the motor housing portion and having a rotor and a stator. The rotor is configured to rotationally drive a motor shaft about a rotational axis. The power tool further includes a switching network electrically coupled to the brushless DC motor. The power tool further includes a user input function to set a loss of control sensitivity level. The power tool further includes an electronic processor. The user selects the loss of control sensitivity level and the electronic processor determines a set of predetermined threshold values corresponding to the set sensitivity level. The electronic processor then detects a loss of control event and halts motor operation.

Embodiments described herein provide a power tool that includes a housing having a motor housing portion, a handle portion, and a battery pack interface. The power tool further includes a brushless direct current ("DC") motor within the motor housing portion and having a rotor and a stator. The rotor is configured to rotationally drive a motor shaft about a rotational axis. The power tool further includes a switching network electrically coupled to the brushless DC motor. The power tool further includes a loss of control detection feature. A loss of control sensitivity detection is set by a user. The loss of control sensitivity level corresponds to a plurality of predetermined thresholds. The power tool further includes at least one indicator located on the power tool housing. The indicator is configured to, for example, blink a first pattern when a user sends a command for the power tool. The indicator is further configured to blink a second pattern when the sensitivity level of the loss of control detection is changed to a different sensitivity level. The indicator is also configured to blink a third pattern when the sensitivity level of the loss of control detection is changed back to an original sensitivity level.

Embodiments described herein provide a power tool that includes a housing having a motor housing portion, a handle portion, and a battery pack interface. The power tool further includes a brushless direct current ("DC") motor within the motor housing portion and having a rotor and a stator. The rotor is configured to rotationally drive a motor shaft about a rotational axis. The power tool further includes a switching network electrically coupled to the brushless DC motor. The power tool further includes a first variable speed input. The first variable speed input is configured to select a maximum operating speed of the power tool. The power tool further includes a second variable speed input, the second variable speed input controls the operational speed of the power tool.

Between the first variable speed input and the second variable speed input, the power tool operates under the selected speed conditions.

Embodiments described herein provide a power tool that includes a housing, a brushless direct current ("DC") motor, and current sensing resistor network. The brushless direct current ("DC") motor is within the motor housing portion and has a rotor and a stator. The rotor is configured to rotationally drive a motor shaft about a rotational axis. The current sensing resistor network mounted to a printed circuit board. The current sensing resistor network includes a first current sense resistor, a second current sense resistor, and a third current sense resistor. The second current sense resistor forms approximately 45 degree angles with respect to the first current sense resistor and the second current sense resistor. The current sensing resistor network is configured to measure current delivered to the brushless DC motor.

Embodiments described herein provide a method for operating a powered tool. The method includes receiving, with an electronic processor, a first variable speed input. The first variable speed input is a maximum operating speed for the power tool. The method further includes receiving, with the electronic processor, a second variable speed input. The second variable speed input is an operating speed for the power tool up to the maximum operating speed for the power tool. The method further includes receiving, with the electronic processor, a user input. The user input is a sensitivity level for loss of control detection. The method further includes controlling, with the electronic processor, a switching network of the power tool to drive a brushless direct current ("DC") motor at the operating speed based on the first variable speed input and the second variable speed input. The method further includes receiving, from an acceleration sensor with the electronic processor, one or more signals related to an acceleration of a housing of the power tool. The acceleration sensor is located on a printed circuit board and measures the acceleration of the housing of the power tool with respect to at least two axes. The printed circuit board positioned at an angle within the housing. The method further includes determining, with the electronic processor, that the one or more signals exceed an acceleration threshold corresponding to the sensitivity level for loss of control detection. The method further includes controlling, with the electronic processor, the switching network to brake the brushless DC motor in response to the one or more signals exceeding the acceleration threshold.

Embodiments described herein provide a method for operating a powered tool. The method includes receiving, with an electronic processor, a first variable speed input. The first variable speed input is a maximum operating speed for the power tool. The method further includes receiving, with the electronic processor, a second variable speed input. The second variable speed input is an operating speed for the power tool up to the maximum operating speed for the power tool. The method further includes receiving, with the electronic processor, a user input. The user input is a sensitivity level for loss of control detection. The method further includes controlling, with the electronic processor, a switching network of the power tool to drive a brushless direct current ("DC") motor at the operating speed based on the first variable speed input and the second variable speed input. The method further includes receiving, from an acceleration sensor with the electronic processor, one or more signals related to an acceleration of a housing of the power tool. The acceleration sensor is located on a printed circuit board and measures the acceleration of the housing of the power tool with respect to at least two axes. The printed circuit board positioned at an angle within the housing. The method further includes determining, with the electronic processor, that the one or more signals exceed an acceleration threshold corresponding to the sensitivity level for loss of control detection. The method further includes controlling, with the electronic processor, the switching network to brake the brushless DC motor in response to the one or more signals exceeding the acceleration threshold. The method further includes enabling, with the electronic processor, an indicator of the housing of the power tool according to a first pattern of blinking when a command for the power tool is received. The method further includes enabling, with the electronic processor, the indicator of the housing of the power tool according to a second pattern of blinking when the sensitivity level for loss of control detection is changed to a second level. The method further includes enabling, with the electronic processor, the indicator of the housing of the power tool according to a third pattern of blinking when the sensitivity level for loss of control detection is changed to a third level.

Embodiments described herein provide a method for operating a powered tool. The method includes receiving, with an electronic processor, a first variable speed input. The first variable speed input is a maximum operating speed for the power tool. The method further includes receiving, with the electronic processor, a second variable speed input. The second variable speed input is an operating speed for the power tool up to the maximum operating speed for the power tool. The method further includes receiving, with the electronic processor, a user input. The user input is a sensitivity level for loss of control detection. The method further includes controlling, with the electronic processor, a switching network of the power tool to drive a brushless direct current ("DC") motor at the operating speed based on the first variable speed input and the second variable speed input. The method further includes receiving, from an acceleration sensor with the electronic processor, one or more signals related to an acceleration of a housing of the power tool. The acceleration sensor is located on a printed circuit board and measures the acceleration of the housing of the power tool with respect to at least two axes. The printed circuit board positioned at an angle within the housing. The method further includes determining, with the electronic processor, that the one or more signals exceed an acceleration threshold corresponding to the sensitivity level for loss of control detection. The method further includes controlling, with the electronic processor, the switching network to brake the brushless DC motor in response to the one or more signals exceeding the acceleration threshold. The method further includes modifying, with the electronic processor, the sensitivity level for loss of control detection based on a predetermined number of activations of the second variable speed input.

Embodiment described herein provide a method for operating a powered tool. The method includes receiving, with an electronic processor, a first variable speed input. The first variable speed input is a maximum operating speed for the power tool. The method further includes receiving, with the electronic processor, a second variable speed input. The second variable speed input is an operating speed for the power tool up to the maximum operating speed for the power tool. The method further includes receiving, with the electronic processor, a user input. The user input is a sensitivity level for loss of control detection. The method further includes controlling, with the electronic processor, a switching network of the power tool to drive a brushless direct current ("DC") motor at the operating speed based on the first variable speed input and the second variable speed input. The method further includes receiving, from an acceleration sensor with the electronic processor, one or more signals related to an acceleration of a housing of the power tool. The acceleration sensor is located on a printed circuit board and measures the acceleration of the housing of the power tool with respect to at least two axes. The printed circuit board positioned at an angle within the housing. The method further includes determining, with the electronic processor, that the one or more signals exceed an acceleration threshold corresponding to the sensitivity level for loss of control detection. The method further includes controlling, with the electronic processor, the switching network to brake the brushless DC motor in response to the one or more signals exceeding the acceleration threshold. The method further includes receiving, with the electronic processor, the first variable speed input from an external device.

Another embodiment provides a method for operating a powered tool. The method further includes receiving, from a current sensing resistor network with an electronic processor, a measured current delivered to a brushless DC motor. The current sensing resistor network is mounted to the printed circuit board. The current sensing resistor network includes a first current sense resistor, a second current sense resistor, and a third current sense resistor. The second current sense resistor forms approximately 45 degree angles with respect to the first current sense resistor and the second current sense resistor.

Power tools described herein include a variable speed input, a brushless DC motor, a switching network, an acceleration sensor, and a controller. The variable speed input is configured to control an operating speed for the power tool up to a maximum operating speed for the power tool. The brushless DC motor has a rotor and a stator. The rotor is configured to rotationally drive a motor shaft about a rotational axis. The switching network is electrically connected to the brushless DC motor. The switching network is configured to control operation of the brushless DC motor. The acceleration sensor is configured to measure an acceleration of the power tool with respect to at least two axes. The controller is connected to the switching network and the acceleration sensor. The controller is configured to control the switching network to drive the brushless DC motor at the operating speed based on the variable speed input, receive one or more signals related to the acceleration corresponding the acceleration of the power tool with respect to the at least two axes, determine a resultant vector value for the acceleration of the power tool with respect to the at least two axes, determine that the resultant vector value exceeds an acceleration threshold, and control the switching network to brake the brushless DC motor in response to the resultant vector exceeding the acceleration threshold.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
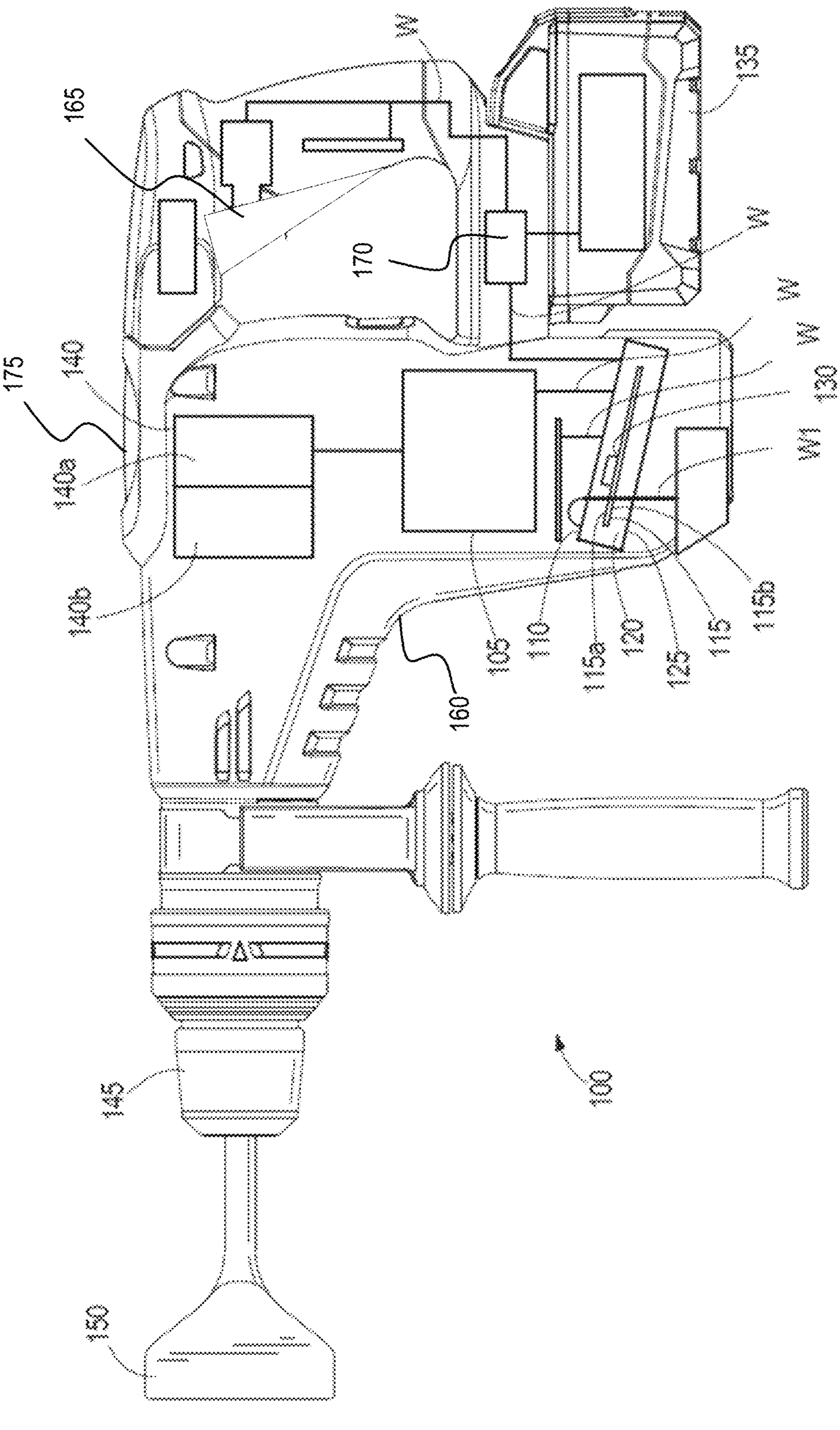
FIG. 1 illustrates an embodiment of a power tool.

FIG. 1 illustrates a power tool 100 (e.g., a rotary hammer) including a brushless direct current ("DC") electric motor 105 and an output housing 140. The output housing 140 includes a gear train 140*a* that receives torque from the motor 105 to rotate a spindle 145, and a reciprocating mechanism 140*b* operable to impact axial impacts to an output shaft 150 (e.g., a drill bit) driven by the spindle 145. The motor 105 receives power from a power source (e.g., a battery pack 135). The battery pack 135 may include any number of different nominal voltages (e.g., 12V, 18V, etc.), and may be configured to have any of a number of different chemistries (e.g., lithium-ion, nickel-cadmium, pouch cells, etc.). In some embodiments, the battery pack 135 is removably coupled to a power tool housing 160. Alternatively, the motor 105 may be powered by a remote power source (e.g., an electrical outlet) through a power cord. The power tool 100 further includes a first variable speed input or trigger 165 which is used to control the motor 105. The trigger 165 drives the motor 105 once the trigger 165 is depressed. In some embodiments, the further inward that the trigger 165 is depressed, the greater the speed of rotation of the motor 105, consequentially increasing the rotational speed of the spindle 145.

The power tool 100 includes a mode selection member 175 rotatable by an operator to switch between a plurality modes. For example, the mode selection member 175 can be used to select a hammer-drill mode, a drill mode, or a hammer only mode.

The power tool 100 also includes a printed circuit board ("PCB") 115 that is positioned within a PCB housing 110 (e.g., a heatsink), and an onboard power source (e.g., the battery pack 135). A bottom wall 125 encloses a plurality of electrical components and allows for the PCB 115 to be secured at an angle within the power tool housing 160. The power tool further includes a second variable speed input (e.g., a dial) 170. The dial 170 (described in further detail below) is operable to set a maximum speed for the power tool 100. Wires W electrically connect the motor 105, the PCB 115, the dial 170, and the battery pack 135. An interior 120 of the PCB housing 110 includes a plurality of switches, such as field effect transistors ("FETs") 130 which are mounted on a first surface 115*a* of the PCB 115, and are operable to function as an inverter bridge circuit to direct electrical current from the battery pack 135 to the motor 105. During use of the power tool 100, the FETs 130 are rapidly and sequentially switched, which generates heat, to transmit power from the battery pack 135 to the motor 105. The PCB 115 includes an opposite second surface 115*b* onto which other electrical components are mounted.

Figure 2:
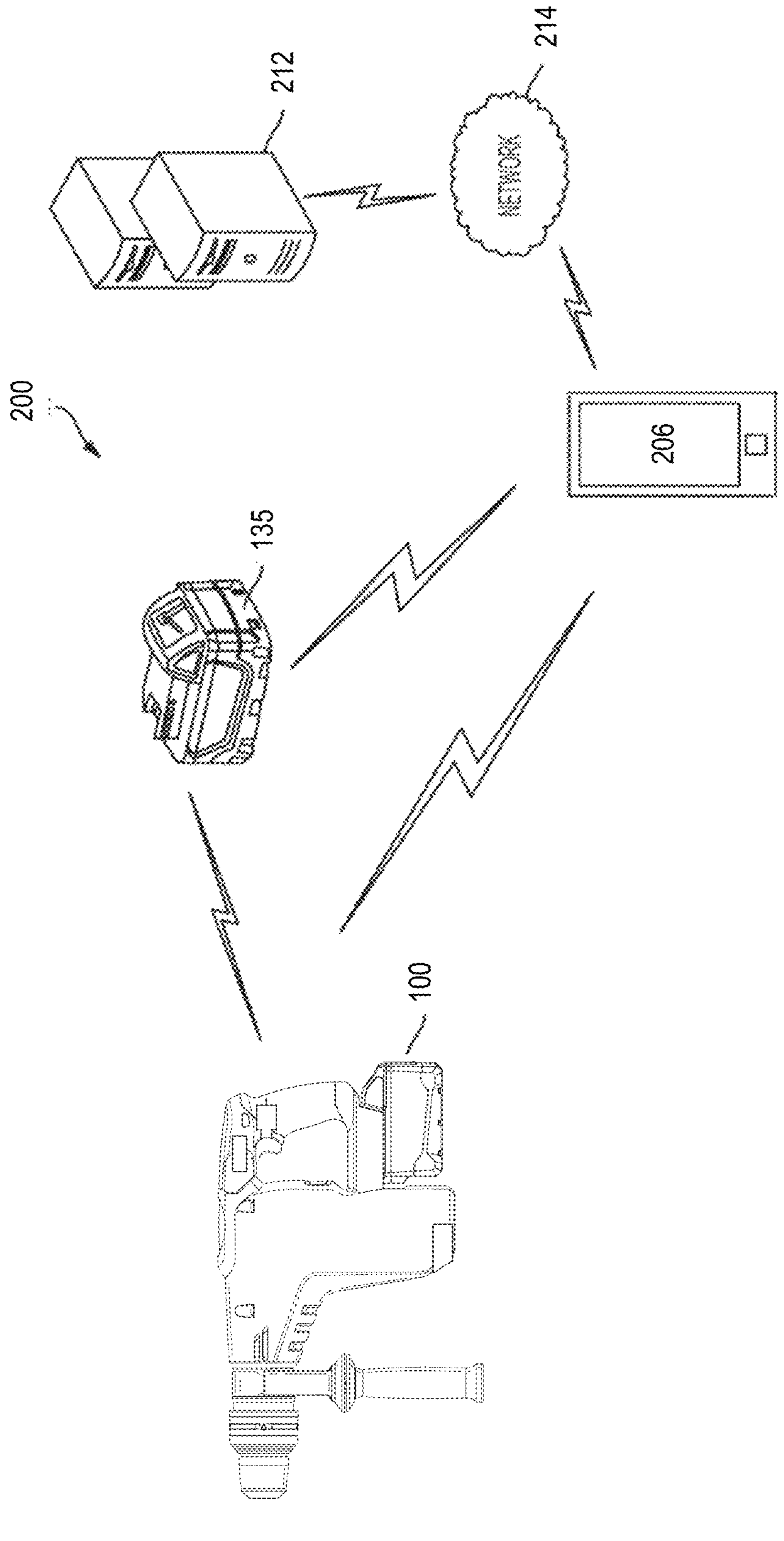
FIG. 2 illustrates an embodiment of a communication network for the power tool of FIG. 1.

FIG. 2 illustrates a communication system 200 for the power tool 100. The communication system 200 includes power tool 100 and an external device 206. Each power tool 100 and power tool battery pack 135 and the external device 206 can communicate wirelessly while they are within a communication range of each other. Each power tool 100 may communicate power tool status, power tool operation statistics, power tool identification, stored power tool usage information, power tool maintenance data, and the like. Therefore, using the external device 206, a user can access stored power tool usage or power tool maintenance data. With this tool data, a user can determine how the power tool 100 has been used, whether maintenance is recommended or has been performed in the past, and identify malfunctioning components or other reasons for certain performance issues. The external device 206 is also configured to transmit data to the power tool 100 for power tool configuration, firmware updates, or to send commands (e.g., turn on a work light, set a maximum speed, set a loss of control sensitivity, etc.). The external device 206 also allows a user to set operational parameters, safety parameters, select tool modes, and the like for the power tool 100.

The external device 206 may be, for example, a smart phone (as illustrated), a laptop computer, a tablet computer, a personal digital assistant ("PDA"), or another electronic device capable of communicating wirelessly with the power tool 100 and providing a user interface. The external device 206 provides a user interface and allows a user to access and interact with the power tool 100. The external device 206 is configured to receive user inputs to determine operational parameters, enable or disable features, and the like. The user interface of the external device 206 provides an easy-to-use interface for the user to control and customize operation of the power tool 100.

The external device 206 includes a communication interface that is compatible with a wireless communication interface of the power tool 100. The communication interface of the external device 206 may include a wireless communication controller (e.g., a Bluetooth® module), or a similar component. The external device 206, therefore, grants the user access to data related to the power tool 100, and provides a user interface such that the user can interact with an electronic processor of the power tool 100.

In addition, as shown in FIG. 2, the external device 206 can also share the information obtained from the power tool 100 with a remote server 212 connected by a network 214. The remote server 212 may be used to store the data obtained from the external device 206, provide additional functionality and services to the user, or a combination thereof. In one embodiment, storing the information on the remote server 212 allows a user to access the information from a plurality of different locations. In another embodiment, the remote server 212 may collect information from various users regarding their power tools and provide statistics or statistical measures to the user based on information obtained from the different power tools. For example, the remote server 212 may provide statistics regarding the experienced efficiency of the power tool 100, typical usage of the power tool 100, and other relevant characteristics and/or measures of the power tool 100. The network 214 may include various networking elements (routers, hubs, switches, cellular towers, wired connections, wireless connections, etc.) for connecting to, for example, the Internet, a cellular data network, a local network, or a combination thereof. In some embodiments, the power tool 100 may be configured to communicate directly with the remote server 212 through an additional wireless interface or with the same wireless interface that the power tool 100 uses to communicate with the external device 206.

In some embodiments, the power tool 100 and power tool battery pack 135 may wirelessly communicate with each other via respective wireless transceivers within each device. For example, the power tool battery pack **135*a* may communicate a battery characteristic to the power tool 100 (e.g., a battery pack identification, a battery pack type, a battery pack weight, a current output capability of the battery pack, and the like). Such communication may occur while the battery pack 135 is coupled to the power tool 100. Additionally or alternatively, the battery pack 135 and the power tool 100 may communicate with each other using a communication terminal while the battery pack 135 is coupled to the power tool 100**.

Figure 3:
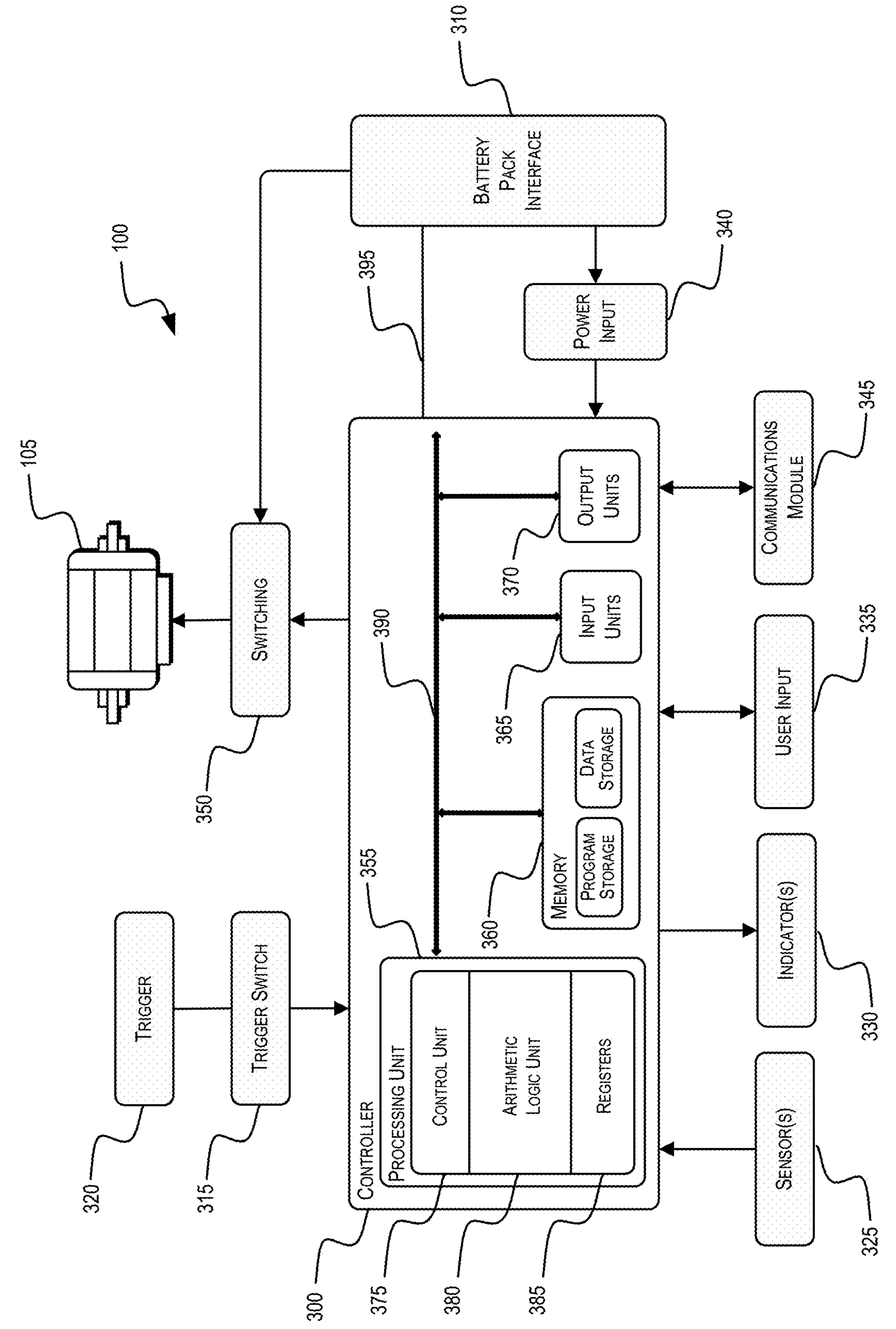
FIG. 3 illustrates an embodiment of a controller for the power tool of FIG. 1.

FIG. 3 illustrates a control system for the power tool 100. The control system includes a controller 300. The controller 300 is electrically and/or communicatively connected to a variety of modules or components of the power tool 100. For example, the illustrated controller 300 is electrically connected to the motor 105, a battery pack interface 310, a trigger switch 315 (connected to the trigger 165), one or more sensors or sensing circuits 325, one or more indicators 330, a user input module 335, a power input module 340, a communications module 345 (e.g., for communicating with the external device 206), and a switching module 350 (e.g., including a plurality of switching FETs 130). The controller 300 includes combinations of hardware and software that are operable to, among other things, control the operation of the power tool 100, monitor the operation of the power tool 100, activate the one or more indicators 330 (e.g., an LED), etc.

The controller 300 includes a plurality of electrical and electronic components that provide power, operational control, and protection to the components and modules within the controller 300 and/or the power tool 100. For example, the controller 300 includes, among other things, a processing unit 355 (e.g., a microprocessor, a microcontroller, an electronic processor, an electronic controller, or another suitable programmable device), a memory 360, input units 365, and output units 370. The processing unit 355 includes, among other things, a control unit 375, an arithmetic logic unit ("ALU") 380, and a plurality of registers 385, and is implemented using a known computer architecture (e.g., a modified Harvard architecture, a von Neumann architecture, etc.). The processing unit 355, the memory 360, the input units 365, and the output units 370, as well as the various modules or circuits connected to the controller 300 are connected by one or more control and/or data buses (e.g., common bus 390). The control and/or data buses are shown generally in FIG. 3 for illustrative purposes. The use of one or more control and/or data buses for the interconnection between and communication among the various modules, circuits, and components would be known to a person skilled in the art in view of the invention described herein.

The memory 360 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 355 is connected to the memory 360 and executes software instructions that are capable of being stored in a RAM of the memory 360 (e.g., during execution), a ROM of the memory 360 (e.g., on a generally permanent basis), or another non-transitory computer readable medium such as another memory or a disc. Software included in the implementation of the power tool 100 can be stored in the memory 360 of the controller 300. The software includes, for example, firmware, one or more applications, program data, filters, rules, one or more program modules, and other executable instructions. The controller 300 is configured to retrieve from the memory 360 and execute, among other things, instructions related to the control processes and methods described herein. In other constructions, the controller 300 includes additional, fewer, or different components.

The battery pack interface 310 includes a combination of mechanical components (e.g., rails, grooves, latches, etc.) and electrical components (e.g., one or more terminals) configured to and operable for interfacing (e.g., mechanically, electrically, and communicatively connecting) the power tool 100 with a battery pack (e.g., the battery pack 135). For example, power provided by the battery pack 135 to the power tool 100 is provided through the battery pack interface 310 to the power input module 340. The power input module 340 includes combinations of active and passive components to regulate or control the power received from the battery pack 135 prior to power being provided to the controller 300. The battery pack interface 310 also supplies power to the switching module 350 to provide power to the motor 105. The battery pack interface 310 also includes, for example, a communication line 395 for providing a communication line or link between the controller 300 and the battery pack 135.

The indicators 330 include, for example, one or more light-emitting diodes ("LEDs"). The indicators 330 can be configured to display conditions of, or information associated with, the power tool 100. For example, the indicators 330 are configured to indicate measured electrical characteristics of the power tool 100, the status of the power tool 100, a loss of control sensitivity level, a change in operational mode of the power tool 100, etc. The user input module 335 is operably coupled to the controller 300 to, for example, select a forward mode of operation or a reverse mode of operation, a torque and/or speed setting for the power tool 100 (e.g., using torque and/or speed switches), etc. In some embodiments, the user input module 335 includes a combination of digital and analog input or output devices required to achieve a desired level of operation for the power tool 100, such as one or more knobs, one or more dials, one or more switches, one or more buttons, etc.

The controller 300 is configured to determine whether a fault condition of the power tool 100 is present and generate one or more control signals related to the fault condition. For example, the sensing circuits 325 include one or more current sensors, one or more speed sensors, one or more Hall Effect sensors, one or more temperature sensors, one or more acceleration sensors, a gyroscope, an inertial measurement unit ("IMU"), etc. The controller 300 calculates or includes, within memory 360, predetermined operational threshold values and limits for operation of the power tool 100. For example, when a potential thermal failure (e.g., of a FET, the motor 105, etc.) is detected or predicted by the controller 300, power to the motor 105 can be limited or interrupted until the potential for thermal failure is reduced. Similarly, if the controller 300 determines that the power tool 100 is experiencing a loss of control event, the controller can cause the motor 105 to be braked to help mitigate the loss of control event. If the controller 300 detects one or more such fault conditions of the power tool 100 or determines that a fault condition of the power tool 100 no longer exists, the controller 300 is configured to provide information and/or control signals to another component of the battery pack 135 (e.g. the battery pack interface 310, the indicators 330, etc.).

Figure 4:
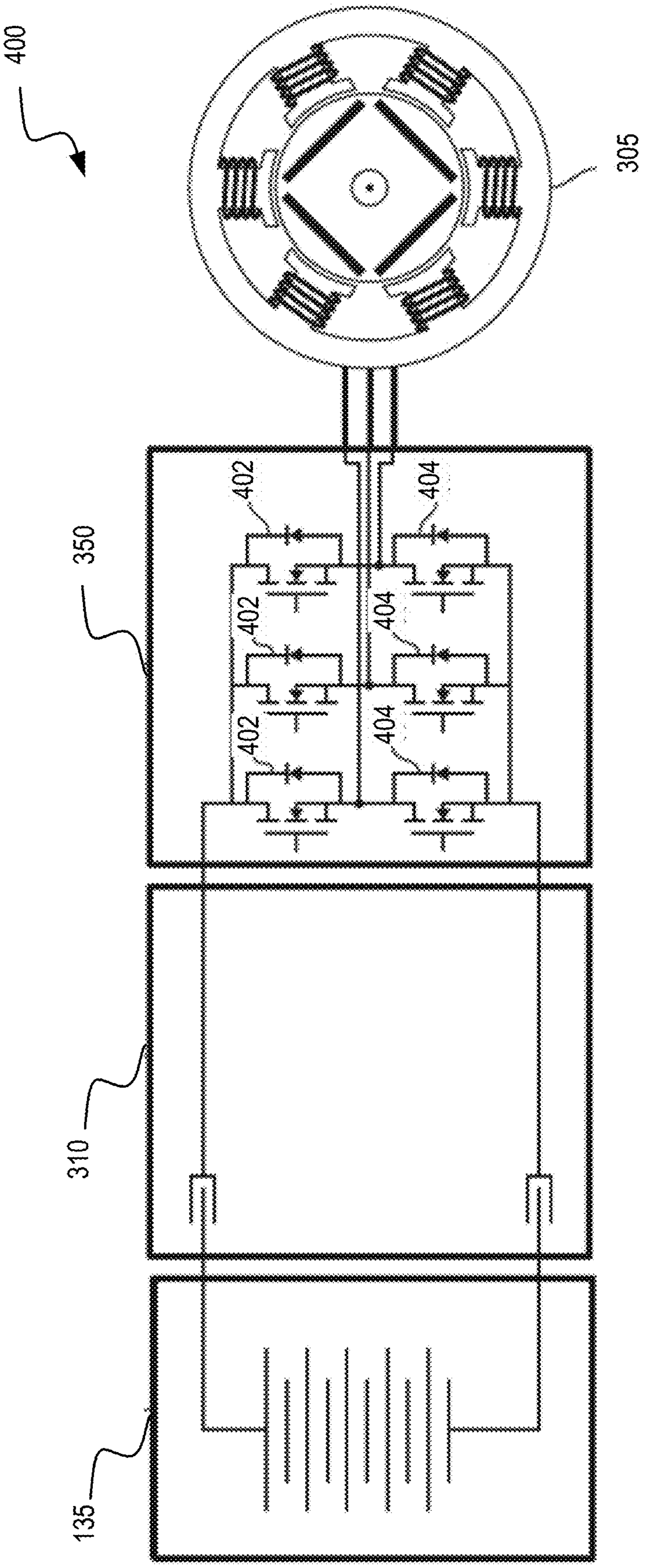
FIG. 4 illustrates an embodiment of a switching network for the power tool of FIG. 1.

FIG. 4 illustrates a control diagram 400 of the FET switching module 350. The FET switching module 350 includes a number of high side power switching elements 402 and a number of low side power switching elements 404. The controller 300 provides the control signals to control the high side FETs 402 and the low side FETs 404 to drive the motor 105 based on the motor feedback information and user controls, as described above. For example, in response to detecting a pull of the trigger 165, the controller 300 provides the control signals to selectively enable and disable the FETs 402 and 404 (e.g., sequentially, in pairs) resulting in power from the power source (e.g., battery pack 135) to be selectively applied to stator coils of the motor 105 to cause rotation of a rotor. More particularly, to drive the motor 105, the controller 300 enables a first high side FET 402 and first low side FET 404 pair (e.g., by providing a voltage at a gate terminal of the FETs) for a first period of time. In response to determining that the rotor of the motor 105 has rotated based on a pulse from the sensing circuits 325, the controller 300 disables the first FET pair, and enables a second high side FET 402 and a second low side FET 404. In response to determining that the rotor of the motor 105 has rotated based on pulse(s) from the sensing circuits 325, the controller 300 disables the second FET pair, and enables a third high side FET 402 and a third low side FET 404. This sequence of cyclically enabling pairs of high side FET 402 and low side FET 404 repeats to drive the motor 105. Further, in some embodiments, the control signals include pulse width modulated ("PWM") signals having a duty cycle that is set in proportion to the amount of trigger pull of the trigger 165, to thereby control the speed or torque of the motor 105.

Figure 5:
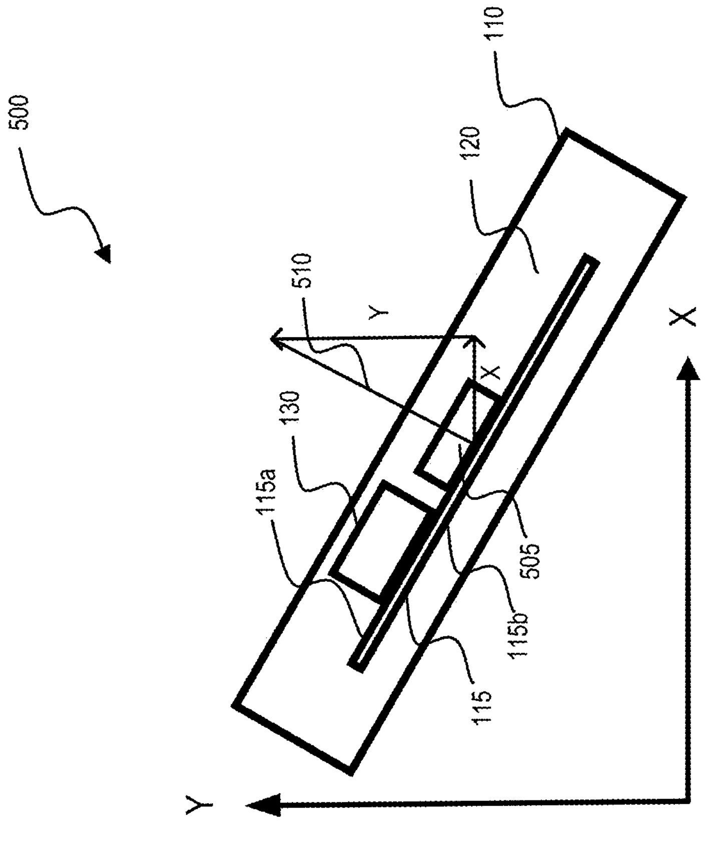
FIG. 5 illustrates an embodiment of an angled printed circuit board for the power tool of FIG. 1.

FIG. 5 illustrates a side view 500 of the PCB 115. The PCB 115 is positioned within the power tool 100 at an inclined angle within the power tool housing 160 structure of the power tool 100. Each side of the PCB housing 110 (or heat sink) contacts, for example, the walls of the power tool housing 160. In some embodiments, each side of the PCB housing 110 contacts a wall of the power tool housing 160 at a different contact point to secure the PCB 115 at a tilted angle with respect to a normal orientation of the power tool 100. This ensures that the PCB 115 is tilted with respect to a normal operating plane of the power tool 100 (as illustrated in FIG. 5). For example, the normal operating plane is suggested to be along the X axis for moving the power tool 100 horizontally (e.g., such that the output shaft 150 is perpendicular to a work surface. The normal operating plane also includes a Y axis for representing movement of the power tool 100 vertically.

The PCB 115 includes a sensor 505 (e.g., a gyroscope measuring angular speed or velocity, one or more acceleration sensors, an inertial measurement unit ("IMU"), etc.) coupled to the first surface 115*a*. Because the PCB 115 is inserted into the tool at such an angle, the sensor will also have a detection axis that is at an angle with respect to the normal operating plane. In some embodiments, the sensor 505 is a gyroscope. The sensor 505 is configured to generate output signals related to a motion of the power tool 100. In a preferred embodiment, the sensor 505 is configured to generate a plurality of output signals that include an X-component output signal and a Y-component output signal. Through the tilted sensor, the PCB 115 is able to determine a resultant vector 510 generated from the X-component and the Y-component. Through the use of the resultant vector, the power tool 100 is able to detect a loss of control of the power tool 100 with respect to at least two axes, as opposed to merely vertical or horizontal (with respect to the normal operating plane) values from a non-angled PCB.

Figure 6B:
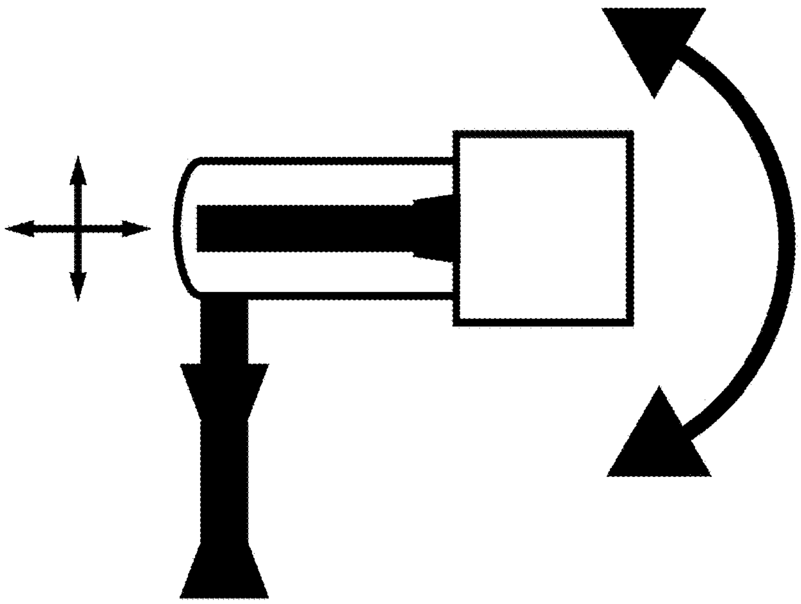
FIGS. 6A and 6B illustrate loss of control event movements, according to some embodiments.
Figure 6A:
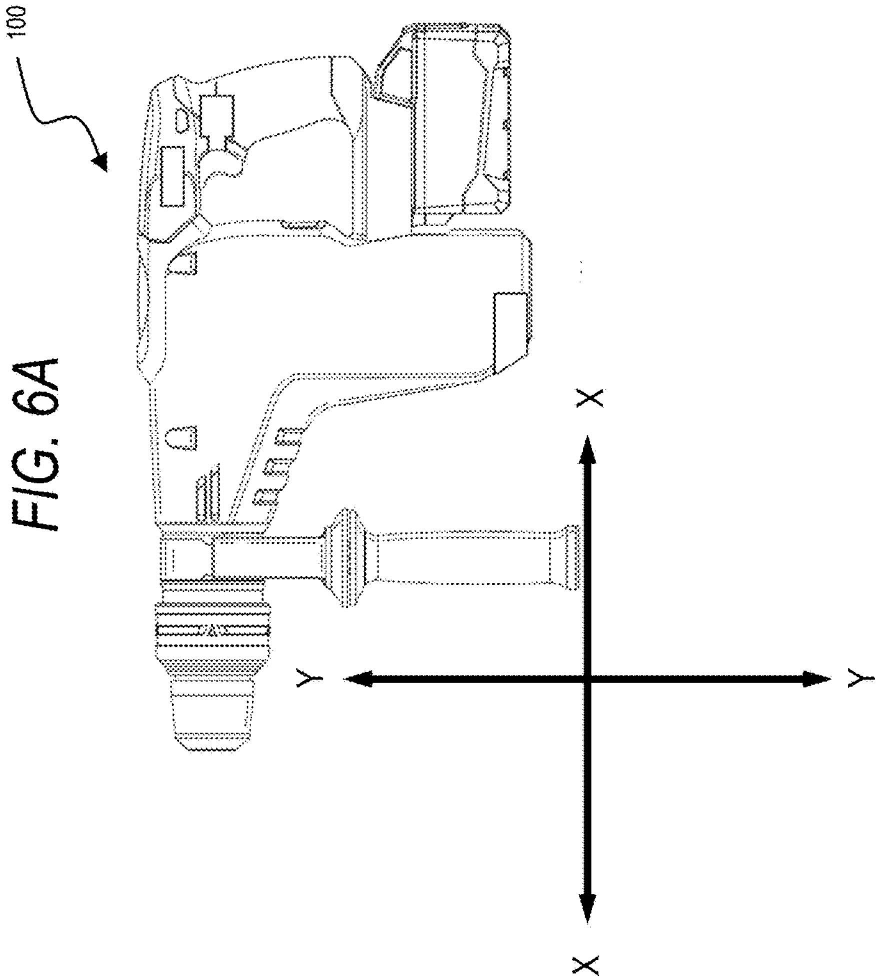

FIG. 6A and FIG. 6B illustrate movements of the power tool 100 that, in some embodiments, trigger a loss of control detection. In FIG. 6A, the power tool 100 is shown in a side view to illustrate a movement along the X axis. The sensor 505 located on the PCB 115 detects a first value along the X axis. In some embodiments, the first value is an acceleration value (e.g., measured using an accelerometer). In some embodiments, the first value is an angular velocity value (e.g., measured using a gyroscope). The power tool 100 may also show movement in the Y axis. The sensor located on the PCB 115 detects a second value along the Y axis. In some embodiments, the second value is an acceleration value (e.g., measured using an accelerometer). In some embodiments, the second value is an angular velocity value (e.g., measured using a gyroscope). The controller 300 may then determine a resultant vector given these two component values. Because the PCB 115 is tilted with respect to the normal operating plane, the PCB 115 can determine if the resultant vector exceeds a predetermined threshold, and if it does, a loss of control is detected. Furthermore, in FIG. 6B, the power tool 100 is shown from a rear perspective. The power tool 100 may rotate from side to side about the output shaft (e.g., in the event of a kickback condition). This rotational movement may be caused by normal operating measures (e.g., a user rotating the tool), or the rotational movement could be a result of a loss of control (e.g., kickback). If the sensor 505 detects a movement of the power tool 100 that exceeds the predetermined threshold for the rotational movement based on the resultant vector, the power tool 100 will deem the action a loss of control and, in some embodiments, brake the motor 105. By using a two axis detection, loss of control can be detected from a motion purely in the X direction, a motion purely in the Y direction, or a combination of both the X direction and the Y direction so long as the resultant vector meets or exceeds the predetermined threshold.

Figure 7:
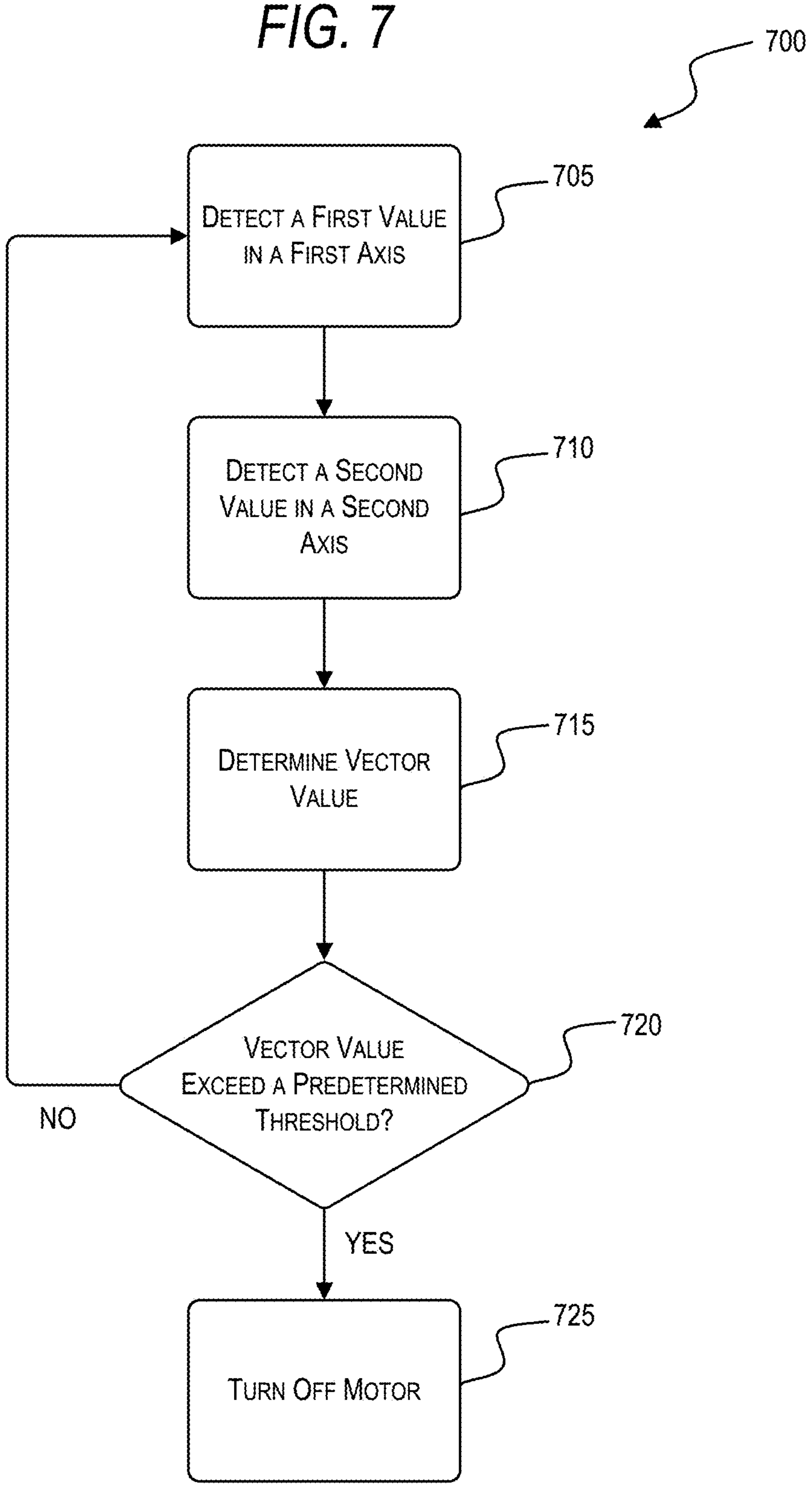
FIG. 7 illustrates a method to detect a loss of control event, according to some embodiments.

FIG. 7 illustrates a method 700 for the power tool 100 that detects a loss of control event of the power tool 100. For example, the power tool includes the sensor 505 located on the PCB 115 that monitors the power tool 100 movement. The PCB 115 may detect a loss of control via the output signals from the sensor 505.

The sensor 505 achieves this by detecting a first value in a first axis (STEP 705). In some embodiments, the first value is an acceleration value (e.g., measured using an accelerometer). In some embodiments, the first value is an angular velocity value (e.g., measured using a gyroscope). In some embodiments, the first axis is the X axis shown in FIG. 5. The sensor then detects a second value in a second axis (STEP 710). In some embodiments, the second value is an acceleration value (e.g., measured using an accelerometer). In some embodiments, the second value is an angular velocity value (e.g., measured using a gyroscope). In some embodiments, the second axis is the Y axis shown in FIG. 5. Using the first value in the first axis and the second value in the second axis, the controller 300 determines a resultant vector value (STEP 715). The controller 300 then compares the determined resultant vector value to a predetermined threshold (STEP 720). If the vector value does not exceed the predetermined threshold, the sensor will return to detecting values in each axis. If the vector value does exceed the predetermined threshold, the controller 300 will determine that a loss of control event has occurred. The controller 300 will then use the FETs 130 to stop the motor 105 (STEP 725), and stopping any further power tool 100 rotation from occurring.

Figure 8:
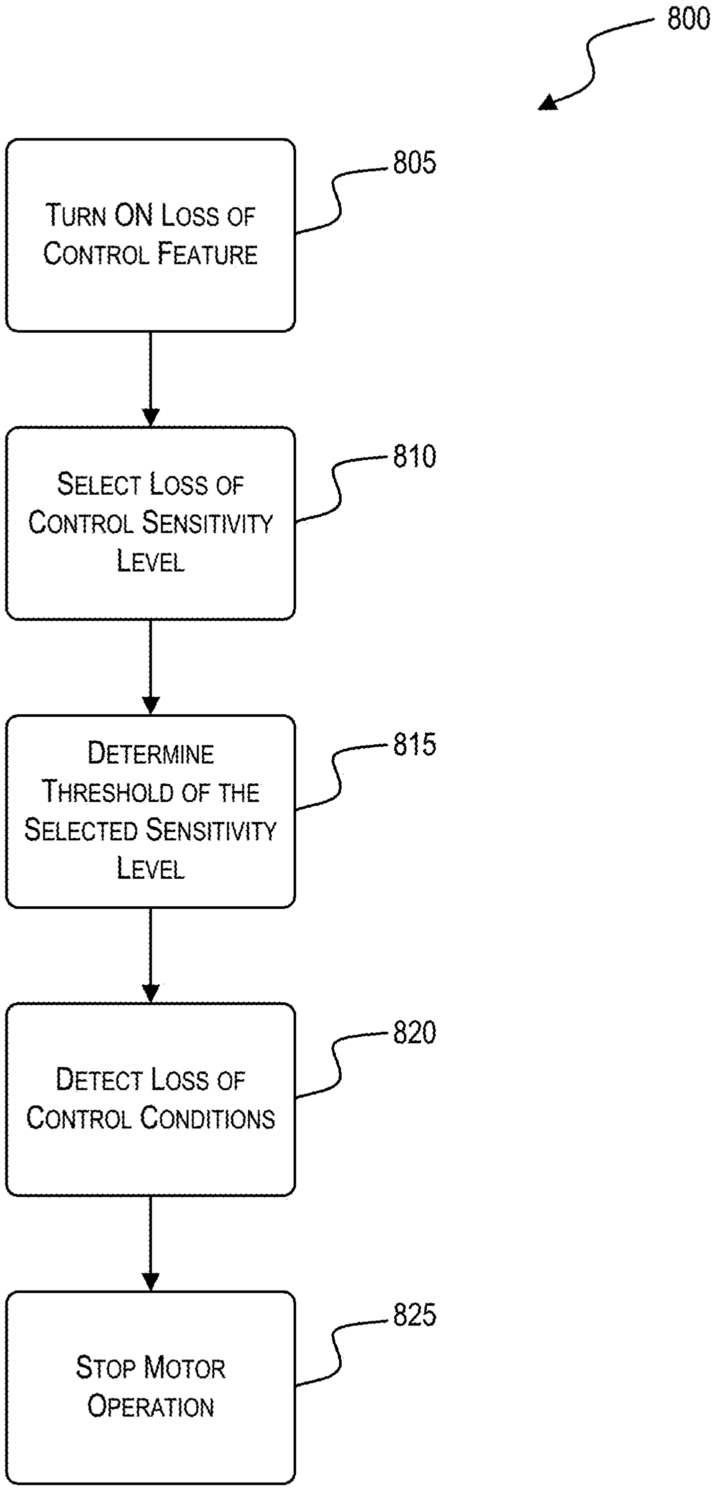
FIG. 8 illustrates a method to select a loss of control sensitivity level, according to some embodiments.

FIG. 8 illustrates a method 800 for the power tool 100 that detects that a loss of control event has occurred. For the method 800, the user has the option to select whether a loss of control detection feature is available during use of the power tool 100. In some embodiments, loss of control detection is enabled or disabled using the user input module 335. In some embodiments, loss of control detection is enabled or disabled using the external device 206. If the user turns ON the loss of control feature (STEP 805), the user will be able to select a particular sensitivity level that will activate the loss of control detection feature within the power tool 100 (STEP 810). For example, if a workpiece is particularly rigid, the power tool 100 might be prone to excessive movement (e.g., rotation) of the power tool 100, without the user actually losing control of the power tool 100. In such a situation, a higher threshold for loss of control may be desirable. Once the user selects a loss of control sensitivity level, the controller 300 will determine a predetermined loss of control threshold for the selected sensitivity level (STEP 815). For example, if the user selects a high sensitivity level, the predetermined threshold will be higher (e.g., a greater value for the resultant vector from sensor 505) than if the user had selected a low sensitivity level.

Once the selection of sensitivity levels has occurred, the sensor 505 will continue to monitor the first value in the first axes and the second value in the second axes. Similar to the method 700 described with respect to FIG. 7, the controller 300 will determine a resultant vector, then compare that resultant vector value against the predetermined threshold. The predetermined threshold can vary depending on the selected sensitivity level, but if the resultant vector value exceeds the predetermined threshold value, the controller 300 will stop motor operations (STEP 825). In some embodiments, the controller 300 will brake the motor 105.

Figure 9:
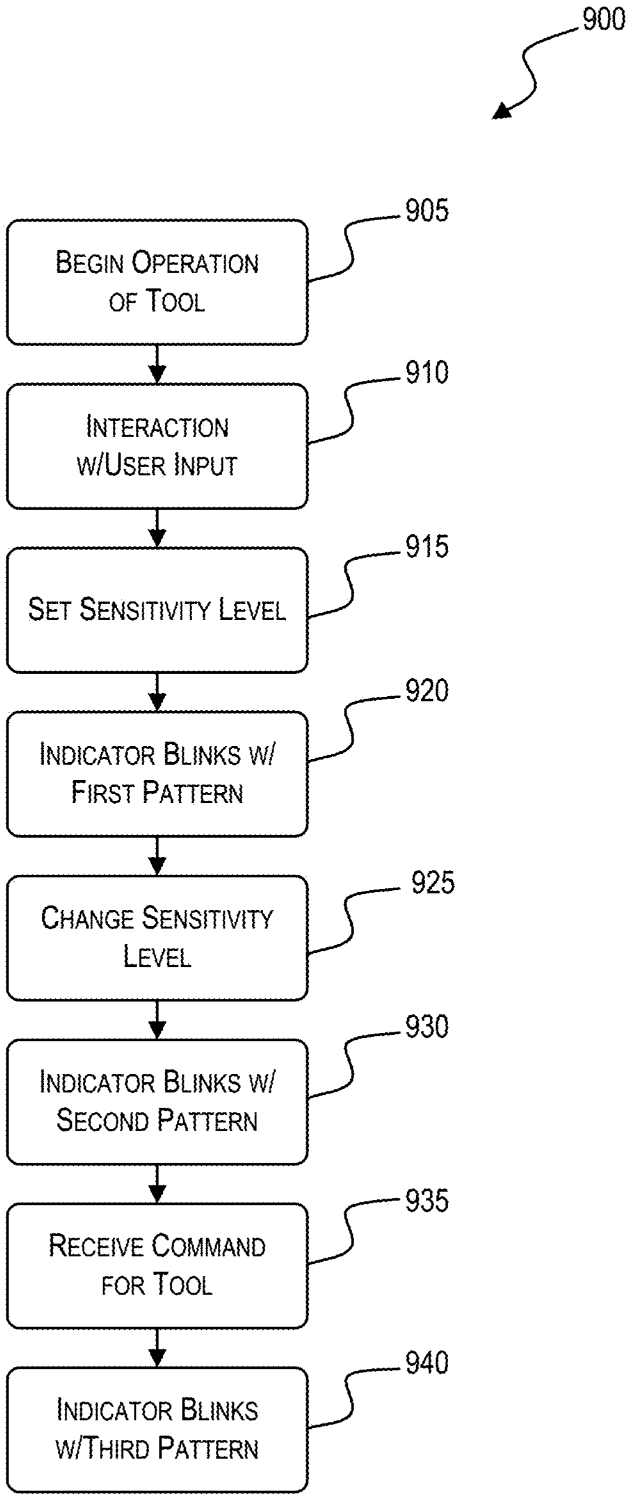
FIG. 9 illustrates a method for selecting and indicating a loss of control sensitivity level.

FIG. 9 illustrates a method 800 for setting a loss of control sensitivity level for the power tool 100. Once the operation of the power tool 100 begins (STEP 905), a user is able to send an interactive command to the power tool 100 (STEP 910). In some embodiments, the user uses the external device 206 to set a sensitivity level of the power tool 100. For example, there are two sensitivity modes: a default sensitivity mode and a low sensitivity mode. The default sensitivity mode includes average predetermined threshold values for operation of the power tool 100 under normal and average operating conditions. The low sensitivity mode includes lower predetermined threshold values for operation of the power tool 100 under particular conditions. Selecting the low sensitivity mode may be a result of performing work on a certain type of workpiece. In other embodiments, additional sensitivity levels can be included (e.g., a high sensitivity level).

In another embodiment, the user pulls the trigger 165 a predetermined number of times (e.g., five times) in succession during the operation of the power tool 100. The series of input or trigger activations causes the power tool to adjust the loss of control sensitivity from a first level to a second level. The power tool receives the user input (e.g., from the external device 206 or from the trigger pulls) and sets the sensitivity level of the power tool 100 (STEP 915). As a response for the receipt of the command to set the sensitivity level, at least one indicator (e.g., an LED located on the power tool housing 160) blinks in a first light pattern (e.g., one blink of light from the indicator) (STEP 920).

At any point throughout operation of the power tool 100, the user may change sensitivity levels without interrupting operation. The need to change sensitivity levels could be a result of, for example, the workpiece composition changing. If the user wishes to change the sensitivity level during an operation of the power tool 100 (STEP 925), the user may communicate with the power tool to change the sensitivity level to either high or low sensitivity. In one embodiment, the user changes the sensitivity level via an external device 206. In another embodiment, the user changes the sensitivity level by pulling the trigger 165 multiple times consecutively. Once the command is received by the power tool 100, the at least one indicator blinks with a second pattern (e.g., blinking twice) to convey that the power tool 100 is entering a different sensitivity mode (STEP 930).

The user may select a third sensitivity level or return to the original sensitivity level at any point throughout operation. The user once again communicates with the power tool 100 to change the sensitivity level to, for example, either a high sensitivity level or a low sensitivity level. In one embodiment, the user changes the sensitivity level via an external device 206. In another embodiment, the user changes the sensitivity level by pulling the trigger 165 multiple times consecutively. Once this command is received by the power tool 100 (STEP 935), the at least one indicator blinks with a third pattern (e.g., blinking four times) conveying that the power tool 100 is entering a different sensitivity mode (STEP 940).

Figure 10:
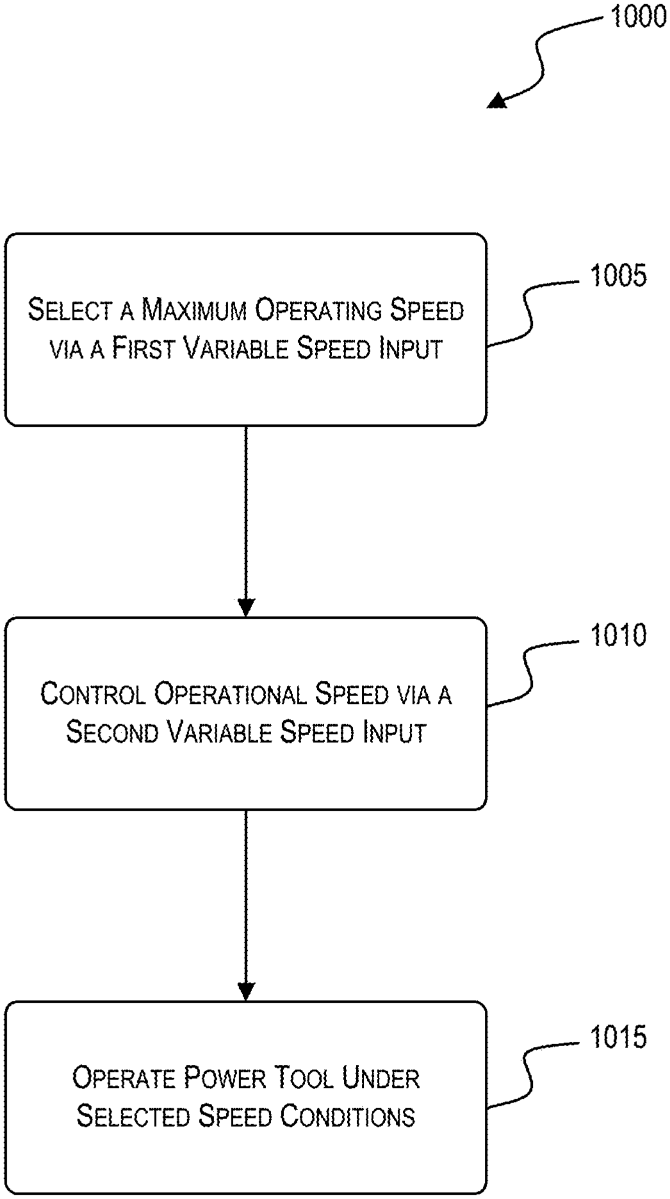
FIG. 10 illustrates a method of setting a maximum speed of the power tool of FIG. 1, according to some embodiments.

FIG. 10 illustrates a method 1000 for the power tool 100 to control the output of the power tool 100. In some embodiments, the user is able to select a maximum operating speed of the power tool 100. This allows for a more controlled operation of the power tool 100 to ensure that the spindle 145 will not exceed an appropriate rotational speed depending on the needs of the user. The user first begins with selecting a maximum operating speed via a first variable speed input (e.g., the dial 170) (STEP 1005). In some embodiments, the user may select a maximum operating speed through the external device 206 (e.g., a smartphone). Additionally or alternatively, the power tool 100 includes the dial 170 located on the power tool 100. The dial 170 is configured so that the maximum speed output is set by rotating the dial 170 to the desired maximum output (e.g., corresponding to numbers between 1 and 10). The user can then control the operational speed of the power tool 100 via a second variable speed input (e.g., the variable speed trigger 320) (STEP 1010). In some embodiments, the second variable speed input includes the variable speed trigger 320. The variable speed trigger 320 allows the user to adjust the speed based on the position of the variable speed trigger 320. For example, the rotational speed of the output shaft 150 increases as the variable speed trigger 320 is depressed towards an inward position, whereas the rotational speed of the output shaft 150 decreases as the variable speed trigger is released towards an outward position. Once the maximum operating speed is set and the user is controlling the operational speed via the second variable speed input, the user is able to operate the power tool 100 under the selected speed conditions (STEP 1015). For example, a target maximum speed of the power tool 100 is achieved when the variable speed trigger is moved to the maximum inward position, but not exceeding the target maximum speed. This allows for a controlled operational use and optimal performance of work.

Figure 11A:
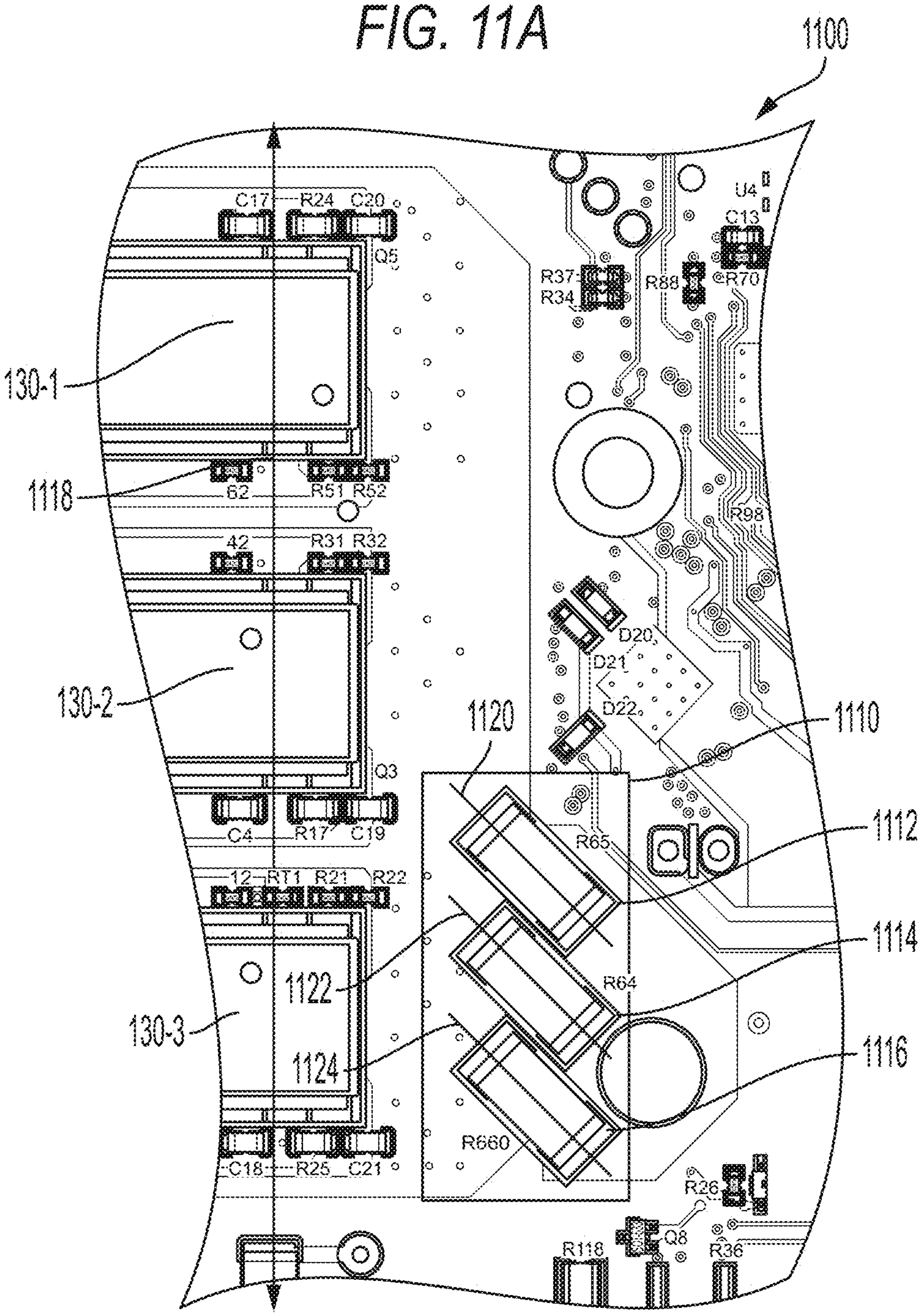
FIG. 11A illustrates a configuration for components of a printed circuit board for the power tool of FIG. 1, according to some embodiments.

FIG. 11A illustrates a configuration for components of the PCB 115 of the power tool 100. The PCB 115 includes a configuration 1100 of circuit components. In this implementation, the configuration 1100 includes the FETs 130, for example, a FET 130-1, a FET 130-2, and a FET 130-3, a current sensing resistor network 1110 including current sense resistors, for example, a current sense resistor 1112, a current sense resistor 1114, and a current sense resistor 1116. In some embodiments, the FET 130-1 is associated with a first phase of the motor 105, the FET 130-2 is associated with a second phase of the motor 105, and the FET 130-3 is associated with a third phase of the motor 105. The FETs 130 are mounted to, for example, the first surface 115*a* of the PCB 115, and are positioned to form a line 1118 on the PCB 115. The FET 130-2 is positioned equidistant between the FET 130-1 and the FET 130-3 on the formed line 1118.

The current sensing resistor ("CSR") network 1110 is configured to measure current delivered to a load (e.g., the motor 105) via the FETs 130. Due to space constraints on the first surface 115*a* of the PCB 115 the current sense resistors of the current sensing resistor network 1110 are mounted to the first surface 115*a* of the PCB 115 and positioned to form respective lines 1120, 1122, 1124 on the PCB 115 proximate to the FET 130-3. The current sense resistor 1114 is positioned equidistant between the current sense resistor 1112 and the current sense resistor 1116, and the lines 1120, 1122, 1124 formed by the current sense resistors 1112-1116 are oriented to form an angle (e.g., approximately 45 degrees) with the formed line 1118 of the FETs 130. Additionally, a current sense tap is applied to the central current sense resistor (e.g., the current sense resistor 1114) of the current sensing resistor network 1110.

In this implementation, the configuration 1100 caused a hardware overcurrent ("HWOC") trip point for the power tool 100 to be low compared to an expected threshold value (e.g., ~80% of an expected trip point). An effect of the board impedances is that the effective impedance of the CSR network 1110 differs depending on which phase is active. In some instances, the board impedance of the PCB 115 between the current sense resistors causes the effective impedance of the current sense resistors to increase above suitable levels. However, if the effective resistance of the current sense resistors is increased (e.g., from 0.33 mΩ to 0.43 mΩ) the HWOC trip point is recovered to the expected value.

In an example, the PCB 115 includes a single layer board with an expected impedance difference of 9% between the first phase of the FET 130-1 and the third phase of the FET 130-3 in respective effective CSR impedances. Consequently, a theoretical 9% difference in stall currents of the FET 130-1 and the FET 130-3, and the effective CSR impedance from the third phase of the FET 130-3 is expected to be approximately equal to, for example, 406 mΩ. In this example, the current sensing resistor network 1110 measures a current of the third phase of the FET 130-3 (e.g., 217 Amperes) and the first phase of the FET 130-1 (e.g., 207 Amperes), which is a 5% difference in stall currents of the FET 130-1 and the FET 130-3, resulting in a measured effective CSR impedance (e.g., 0.415 mΩ) that is higher than the effective CSR impedance from the third phase of the FET 130-3 (e.g., 406 mΩ).

Figure 11B:
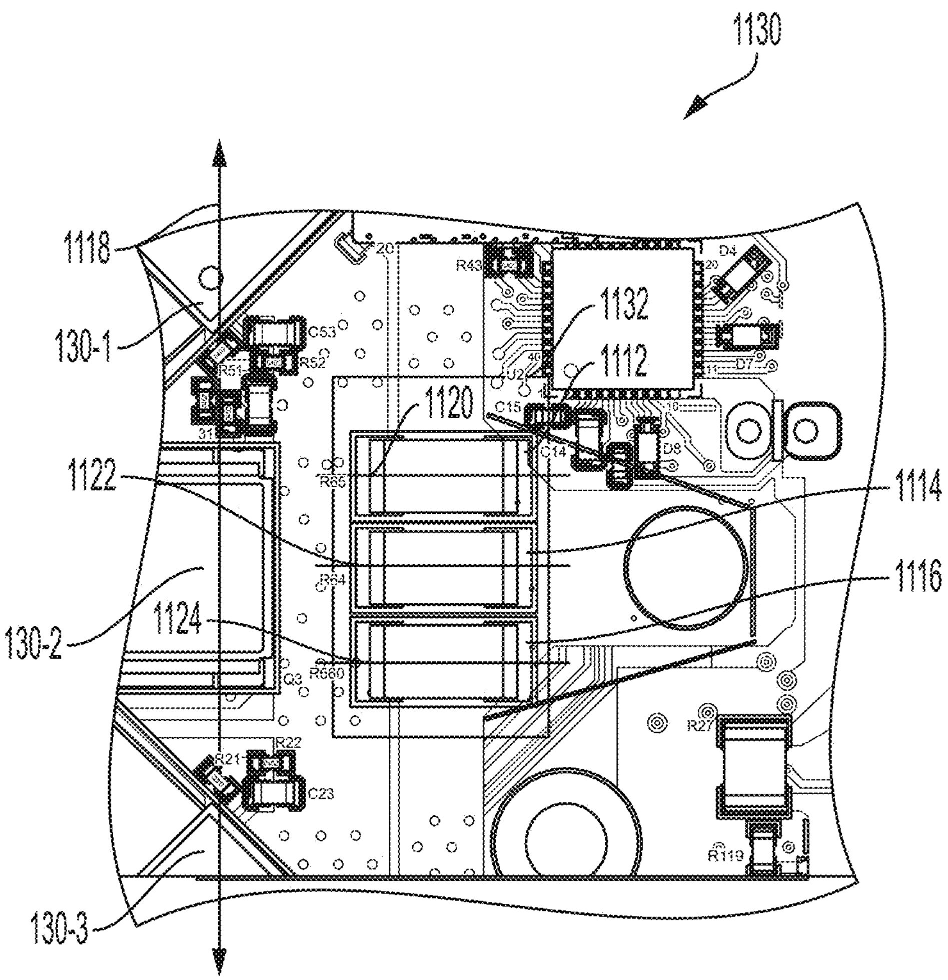
FIG. 11B illustrates a linear, central-mounted current sense resistor configuration for components of a printed circuit board for the power tool of FIG. 1, according to some embodiments.

FIG. 11B illustrates a linear, central-mounted current sense resistor configuration 1130 for components of the PCB 115 of the power tool 100. The PCB 115 includes a linear current sense resistor network configuration. In this implementation, the linear configuration 1130 includes the FETs 130 and a current sensing resistor network 1132 including the current sense resistors. In an example, the FET 130-1 is associated with a first phase of the motor 105, the FET 130-2 is associated with a second phase of the motor 105, and the FET 130-3 is associated with a third phase of the motor 105. The FETs 130 are mounted to the first surface 115*a* of the PCB 115 and positioned to form the line 1118 on the PCB 115 (as shown in FIG. 11A), or can be angled with respect to one another (e.g., FET 130-1 and FET 130-3 form approximately 45 degree angles with respect to FET 130-2). In some embodiments, the FET 130-1 is positioned to form an angle (e.g., approximately 135 degrees) with the formed line 1118 and the FET 130-3 to form an angle (e.g., approximately 45 degrees) with the formed line 1118.

The current sensing resistor network 1132 is configured to measure the current delivered to a load (e.g., the motor 105) via the FETs 130. Due to phase balancing and size constraints of the configuration 1100, the current sense resistors of the current sensing resistor network 1132 are mounted to the first surface 115*a* of the PCB 115 and positioned to form three parallel lines 1120, 1122, 1124 on the PCB 115. The formed lines 1120, 1122, 1124 of the current sense resistors are parallel to one another and perpendicular to the formed line 1118 of the FETs 130. The current sense resistor 1114 is positioned equidistant between the current sense resistor 1112 and the current sense resistor 1116 of the current sensing resistor network 1132. The stacked height or length of the current sensing resistor network 1132 is proximate and parallel to the FET 130-2. Additionally, a current sense tap is applied to the central current sense resistor (e.g., the current sense resistor 1114) of the current sensing resistor network 1132.

In some instances, the current sensing resistor network 1132, proximate the FET 130-2, is configured to balance capacitor return paths on either side of the inverter bridge circuit. The estimated phase differences from the current sensing resistor network 1132 is approximately 12% with the first phase of the FET 130-1 and the third phase of the FET 130-3 having a CSR impedance of, for example, 0.404 mΩ, and the second phase of the FET 130-2 having a CSR impedance of, for example, 0.362 mΩ.

Figure 11C:
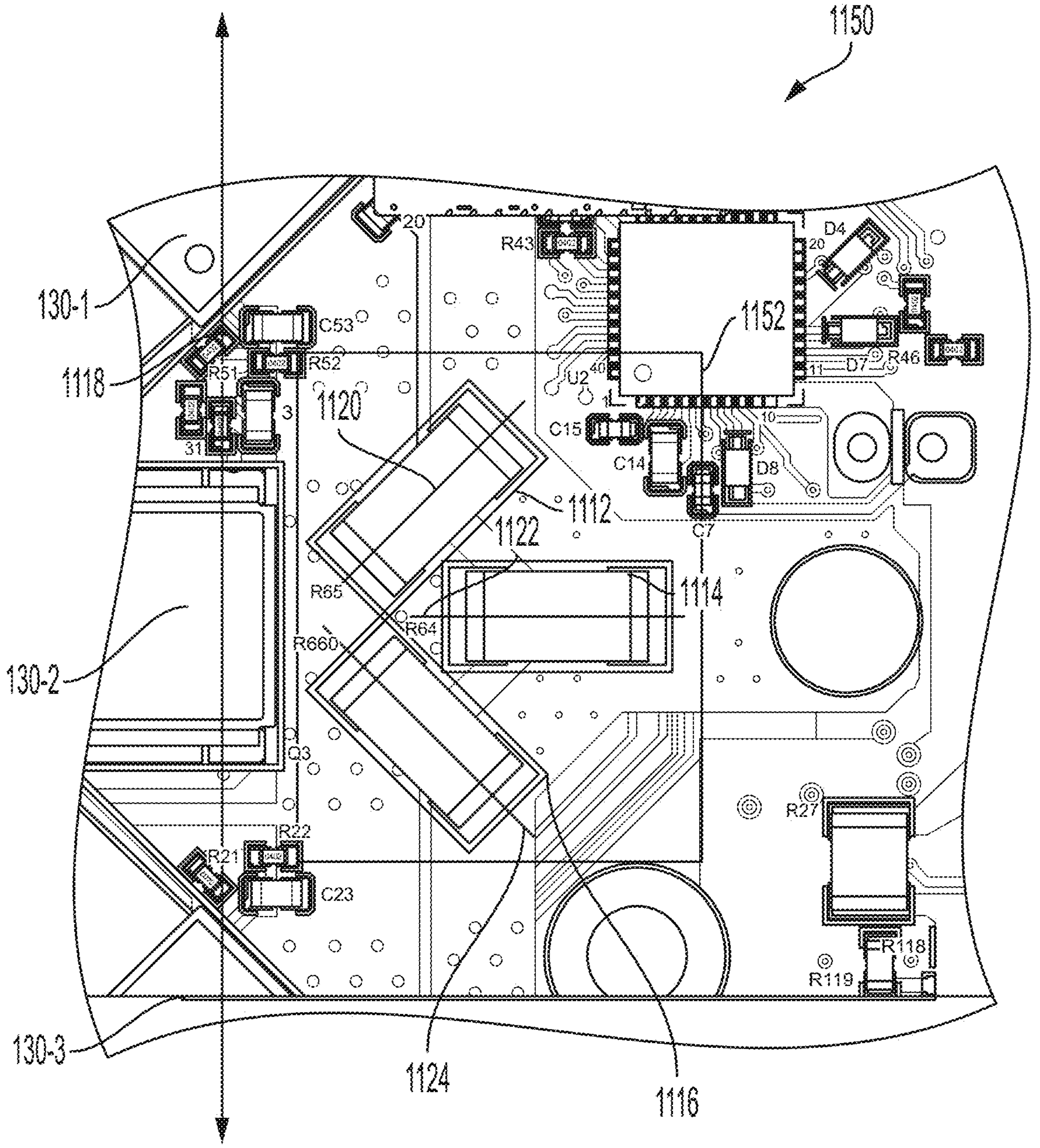
FIG. 11C illustrates a central-mounted current sense resistor configuration for components of a printed circuit board for the power tool of FIG. 1, according to some embodiments.

FIG. 11C illustrates a central-mounted current sense resistor configuration 1150 for components of the PCB 115 of the power tool 100. The PCB 115 includes a central current sense resistor network configuration. In this implementation, the central configuration 1150 includes the FETs 130 and a current sensing resistor network 1152 including the current sense resistors. In an example, the FET 130-1 is associated with a first phase of the motor 105, the FET 130-2 is associated with a second phase of the motor 105, and the FET 130-3 is associated with a third phase of the motor 105. The FETs 130 are mounted to the first surface 115*a* of the PCB 115 and positioned to form the line 1118 on the PCB 115 (as shown in FIG. 11A), or can be angled with respect to one another (e.g., FET 130-1 and FET 130-3 form approximately 45 degree angles with respect to FET 130-2). In some embodiments, the FET 130-1 is positioned to form an angle (e.g., approximately 135 degrees) with the formed line 1118 and the FET 130-3 to form an angle (e.g., approximately 45 degrees) with the formed line 1118.

The current sensing resistor network 1152 is configured to measure the current delivered to a load (e.g., the motor 105) via the FETs 130. Due to phase balancing and size constraints of the configuration 1100, the current sense resistors of the current sensing resistor network 1152 are mounted to the first surface 115*a* of the PCB 115. The current sense resistor 1112 is positioned proximate to the FET 130-2 and forms an angle (e.g., approximately 135 degrees) with the formed line 1118 of the FETs 130. The current sense resistor 1116 is positioned proximate to the FET 130-2 and forms an angle (e.g., approximately 45 degrees) with the formed line 1118 of the FETs 130. The current sense resistor 1114 is positioned proximate and forms an angle (e.g., approximately 90 degrees or perpendicular) with the formed line 1118 of the FETs 130. The current sense resistor 1114 is also positioned equidistant between the current sense resistor 1112 and the current sense resistor 1116 and forms approximately 45 degree angles with respect to the current sense resistors 1112 and 1116.

Various embodiments of the present disclosure recognize that CSR network layouts are required to decrease size impact of the PCB assembly and impedance differences between the phases. In some implementations, the current sensing resistor network 1152 allows for compact size the PCB 115 and improved phase balancing at the cost of increased length and width of the current sensing resistor network 1152. The current sensing resistor network 1152 increases the CSR output impedance that is always present and decreases the input impedance to each CSR, which reduces the impedance difference based on phase irrespective of the phase the current path comes from.

For a minor sacrifice of length and width of the CSR network 1152, a width of the PCB 115 can be reduced slightly due to the impedance paths at the end of the two flanking CSRs (e.g., the current sense resistor 1112 and the current sense resistor 1116). For example, The estimated phase impedance differences from the current sensing resistor network 1152 is approximately 0.2% with the effective phase impedance of the first phase of the FET 130-1 and the third phase of the FET 130-3 are, for example, 0.405 mΩ and the effective phase impedance of the second phase of the FET 130-2 is, for example, 0.404 mΩ.

Thus, embodiments described herein provide, among other things, a power tool with loss of control detection and speed control features. Various features and advantages are set forth in the following claims.

What is claimed is:

1. A power tool comprising:

a housing having a motor housing portion, a handle portion, and a battery pack interface;

a first variable speed input configured to set a maximum operating speed for the power tool;

a second variable speed input configured to control an operating speed for the power tool up to the maximum operating speed for the power tool;

a brushless direct current ("DC") motor within the motor housing portion and having a rotor and a stator, wherein the rotor is configured to rotationally drive a motor shaft about a rotational axis;

a switching network electrically coupled to the brushless DC motor;

a user input configured to set a sensitivity level for loss of control detection;

an acceleration sensor configured to measure an acceleration of the housing;

an electronic processor connected to the switching network and the sensor, the electronic processor configured to:

control the switching network to drive the brushless DC motor at the operating speed based on the first variable speed input and the second variable speed input, receive one or more signals related to the acceleration of the housing of the power tool from the acceleration sensor, determine that the one or more signals exceed an acceleration threshold corresponding to the sensitivity level for loss of control detection, and control the switching network to brake the brushless DC motor in response to the one or more signals exceeding the acceleration threshold.

2. The power tool of claim 1, further comprising:

a printed circuit board positioned at an angle within the housing;

wherein the acceleration sensor is located on the printed circuit board, and wherein the acceleration sensor is configured to measure the acceleration of the housing of the power tool with respect to at least two axes.

3. The power tool of claim 1, wherein the first variable speed input is a dial.

4. The power tool of claim 1, wherein the first variable speed input is configured through an external device.

5. The power tool of claim 1, wherein the power tool includes at least one indicator positioned on the power tool housing.

6. The power tool of claim 5, wherein the at least one indicator is configured to blink in a first pattern when a command for the power tool is received.

7. The power tool of claim 6, wherein the at least one indicator is configured to blink in a second pattern when the sensitivity level for loss of control detection is changed to a second level.

8. The power tool of claim 7, wherein the at least one indicator is configured to blink in a third pattern when the sensitivity level for loss of control detection is changed to a third level.

9. The power tool of claim 1, wherein the sensitivity level for loss of control detection is changed based on a predetermined number of activations of the second variable speed input.

10. A method for operating a power tool, the method comprising:

receiving, with an electronic processor, a first variable speed input, wherein the first variable speed input is a maximum operating speed for the power tool;

receiving, with the electronic processor, a second variable speed input, wherein the second variable speed input is an operating speed for the power tool up to the maximum operating speed for the power tool;

receiving, with the electronic processor, a user input, wherein the user input is a sensitivity level for loss of control detection;

controlling, with the electronic processor, a switching network of the power tool to drive a brushless direct current ("DC") motor at the operating speed based on the first variable speed input and the second variable speed input;

receiving, from an acceleration sensor with the electronic processor, one or more signals related to an acceleration of a housing of the power tool;

determining, with the electronic processor, that the one or more signals exceed an acceleration threshold corresponding to the sensitivity level for loss of control detection; and controlling, with the electronic processor, the switching network to brake the brushless DC motor in response to the one or more signals exceeding the acceleration threshold.

11. The method of claim 10, the method further comprising:

enabling, with the electronic processor, at least one indicator of the housing of the power tool according to a first pattern of blinking when a command for the power tool is received.

12. The method of claim 11, the method further comprising:

enabling, with the electronic processor, the at least one indicator of the housing of the power tool according to a second pattern of blinking when the sensitivity level for loss of control detection is changed to a second level.

13. The method of claim 12, the method further comprising:

enabling, with the electronic processor, the at least one indicator of the housing of the power tool according to a third pattern of blinking when the sensitivity level for loss of control detection is changed to a third level.

14. The method of claim 10, the method further comprising:

modifying, with the electronic processor, the sensitivity level for loss of control detection based on a predetermined number of activations of the second variable speed input.

15. The method of claim 10, the method further comprising:

receiving, with the electronic processor, the first variable speed input from an external device.

16. The method of claim 10, wherein:

the acceleration sensor is located on a printed circuit board for measuring the acceleration of the housing of the power tool with respect to at least two axes; and the printed circuit board is positioned at an angle within the housing.

17. A power tool comprising:

a variable speed input configured to control an operating speed for the power tool up to a maximum operating speed for the power tool;

a brushless direct current ("DC") motor having a rotor and a stator, wherein the rotor is configured to rotationally drive a motor shaft about a rotational axis;

a switching network electrically connected to the brushless DC motor, the switching network configured to control operation of the brushless DC motor;

an acceleration sensor configured to measure an acceleration of the power tool with respect to at least two axes, and a controller connected to the switching network and the acceleration sensor, the controller configured to:

control the switching network to drive the brushless DC motor at the operating speed based on the variable speed input, receive one or more signals related to the acceleration corresponding the acceleration of the power tool with respect to the at least two axes, determine a resultant vector value for the acceleration of the power tool with respect to the at least two axes, determine that the resultant vector value exceeds an acceleration threshold, and control the switching network to brake the brushless DC motor in response to the resultant vector value exceeding the acceleration threshold.

18. The power tool of claim 17, wherein the controller is further configured to receive a sensitivity level for loss of control detection from an external device.

19. The power tool of claim 18, further comprising:

at least one indicator configured to blink in a first pattern when the sensitivity level for loss of control detection is received.

20. The power tool of claim 19, wherein the at least one indicator is configured to blink in a second pattern when the sensitivity level for loss of control detection is changed to a second sensitivity level for loss of control detection.

* * * * *